US012749633B2

(12) United States Patent
Wang et al.

(10) Patent No.: US 12,749,633 B2
(45) Date of Patent: Sep. 29, 2026

(54) DEVICE FOR LIMITING MOVEMENT OF MOVABLE PART IN ELECTRICAL EQUIPMENT

(71) Applicant: Schneider Electric Industries SAS, Rueil Malmaison (FR)

(72) Inventors: Zhibao Wang, Shanghai (CN); Zhen Li, Shanghai (CN); Wanruo Lou, Shanghai (CN); Min Xu, Shanghai (CN); Haifeng Tian, Shanghai (CN); Zaiyan Zhang, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 220 days.

(21) Appl. No.: 18/431,417

(22) Filed: Feb. 2, 2024

(65) Prior Publication Data

US 2024/0266124 A1 Aug. 8, 2024

(30) Foreign Application Priority Data

Feb. 3, 2023 (CN) ........................ 202310092005.0

(51) Int. Cl.
*H01H 9/00* (2006.01)
*H01H 1/14* (2006.01)

(52) U.S. Cl.
CPC ................ *H01H 9/00* (2013.01); *H01H 1/14* (2013.01)

(58) Field of Classification Search
CPC .. H01H 9/00; H01H 1/14; H01H 3/60; H01H 50/12; H01H 50/30; H01H 1/50; H01H 3/605; H01H 13/06; H01H 2221/062
See application file for complete search history.

(56) References Cited

U.S. PATENT DOCUMENTS

| | | | | |
|---|---|---|---|---|
| 6,296,237 B1 * | 10/2001 | Nagai | ........................ | F16F 9/58 267/140 |
| 2016/0225552 A1 * | 8/2016 | Guentner | ............... | H01H 13/84 |
| 2021/0347299 A1 * | 11/2021 | Groleau | ................. | B60Q 5/003 |

FOREIGN PATENT DOCUMENTS

| | | | | |
|---|---|---|---|---|
| AT | 178961 B | 7/1954 | | |
| CN | 111081496 A | 4/2020 | | |
| CN | 118231185 A * | 6/2024 | ........... | H01H 50/645 |

(Continued)

OTHER PUBLICATIONS

Extended European Search Report dated Jul. 1, 2024 for corresponding European Patent Application No. 24305177.8-1201, 7 pages.

*Primary Examiner* — Ahmed M Saeed
(74) *Attorney, Agent, or Firm* — Wolf, Greenfield & Sacks, P.C.

(57) ABSTRACT

The present disclosure relates to a device for limiting movement of a movable part in electrical equipment and the electrical equipment including the same. The limiting device includes: a stopper provided in a moving path of the movable part and configured to contact the movable part at a predetermined position to prevent the movable part from moving; wherein the stopper is mainly formed of an elastomer and includes a stop surface, the elastomer being configured to be deformed when the movable part collides with the stop surface in a first direction; and wherein the elastomer further includes holes. With the holes being provided in the elastomer, impact resistance of the elastomer is enhanced, and performance deterioration of the elastomer due to a temperature rise is compensated.

20 Claims, 6 Drawing Sheets

(56) References Cited

FOREIGN PATENT DOCUMENTS

| | | | |
|---|---|---|---|
| EP | 3157038 | B1 | 5/2018 |
| GB | 913745 | A | 12/1962 |
| JP | 6251654 | A | 9/1994 |
| JP | 3052343 | B2 | 6/2000 |

* cited by examiner

DEVICE FOR LIMITING MOVEMENT OF MOVABLE PART IN ELECTRICAL EQUIPMENT

CROSS-REFERENCE TO RELATED APPLICATIONS

This patent claims priority to and the benefit under 35 U.S.C. § 119(d) of Chinese Patent Application No. 202310092005.0, filed on Feb. 3, 2023.

FIELD

Embodiments of the present disclosure generally relate to an electrical equipment, and particularly to a device for limiting movement of a movable part in the electrical equipment.

BACKGROUND

Switching devices such as circuit breakers are typically provided with a movable contact, a stationary contact and an actuating assembly for driving the movable contact. The actuating assembly may drive the movable contact to move to selectively come into contact or out of contact with the stationary contact. After the switching device receives an opening instruction, the movable contact, driven by the actuating assembly, separates from the stationary contact. In this process, there is a risk that the movable contact may accidentally re-contact the stationary contact under the action of an elastic restoring force.

To prevent this case, the switching device is also usually provided with a damper for limiting the movement of a movable part in the switching device. By the damper absorbing the energy of the movable part, an accidental contact between the movable contact and the stationary contact is prevented to avoid the re-closing when the switching device opens. A conventional damper is usually made of an elastomer which has a temperature-sensitive characteristic. However, when an internal temperature of the switching device is too high, the shock-absorbing capacity of the elastomer decreases, which causes a higher risk of accidental contact between the movable contact and the stationary contact when the switching device opens. It is desirable to improve the conventional dampers to improve the performance of the device.

SUMMARY

Embodiments of the present disclosure provide a device for limiting movement of a movable part in an electrical equipment and the electrical equipment intended to address one or more of the above problems and other potential problems.

According to a first aspect of the present disclosure, there is provided a device for limiting movement of a movable part in an electrical equipment, comprising: a stopper provided in a moving path of the movable part and configured to contact the movable part at a predetermined position to prevent the movable part from moving; wherein the stopper is mainly formed of an elastomer and comprises a stop surface, the elastomer being configured to be deformed when the movable part collides with the stop surface in a first direction; and wherein the elastomer further comprises holes. According to the embodiments of the present disclosure, by providing the holes in the elastomer to enhance an impact resistance of the elastomer and to compensate for performance deterioration of the elastomer due to a temperature rise, stopping performances of the elastomer thus is significantly improved.

In some embodiments, the hole comprises a through hole running through the elastomer in a thickness direction, and the through hole is configured to allow a fluid in the through hole to flow at least partially out of the through hole when the movable part collides with the stop surface in the first direction. According to the embodiment of the present disclosure, by converting a portion of the kinetic energy of the movable part into the kinetic energy of the fluid to enhance the impact resistance performance of the elastomer using the hydrodynamic performance of the fluid and to compensate for the performance deterioration of the elastomer due to a temperature rise, the stopping performance of the elastomer thus is further improved.

In some embodiments, the through hole comprises a cavity having a volume and a shape of the cavity is configured in such a way that an overpressure condition exceeding an ambient pressure occurs within the cavity when the movable part collides with the stop surface in the first direction; and an under-pressure condition below the ambient pressure occurs in the cavity when the movable part rebounds away from the stop surface in a second direction opposite to the first direction under a reaction force of the elastomer. Thus, the efficiency of converting a portion of the kinetic energy of the movable part into the kinetic energy of the fluid may be further enhanced, and the shock-absorbing performance of the elastomer may be improved.

In some embodiments, the through hole has a hole shape that tapers stepwise or linearly in the first direction. In some embodiments, the hole shape comprises one of a cone, pyramid, truncated cone, or stepped hole.

In some embodiments, the through hole comprises a first hole and a second hole in communication with the first hole, the first hole and the second hole being arranged in the first direction, an average inner diameter of the second hole being smaller than that of the first hole. In this case, an overpressure condition or an under-pressure condition can be conveniently formed.

In some embodiments, the limiting device further comprises a stationary part, and the elastomer is in surface contact with the stationary part or disposed at a distance from the stationary part.

In some embodiments, the elastomer is in surface contact with the stationary part, and the stationary part comprises a first discharge hole in fluid communication with the hole. In this case, the stationary part may be used to further enhance the hydrodynamic effect upon impact, with improved shock-absorbing capability. In some embodiments, an average inner diameter of the first discharge hole is smaller than that of the hole. In particular, the average inner diameter of the first discharge hole is smaller than or equal to that of the discharge hole of the hole. In this case, disturbance in the fluid flow may be further enhanced and the shock-absorbing capability may be further improved.

In some embodiments, the movable part comprises a second discharge hole in fluid communication with the hole at a surface opposite the stop surface. In this case, the stationary part may be used to further enhance the hydrodynamic effect upon impact, with further improved shock-absorbing capability. In some embodiments, an average inner diameter of the second discharge hole is smaller than that of the hole. In particular, the average inner diameter of the second discharge hole is smaller than or equal to that of the discharge hole of the hole. In this case, the disturbance in the fluid flow may be further enhanced and the shock-absorbing capability may be further improved.

In some embodiments, the electrical equipment has different operating temperatures, and a rebound resilience and/or hardness of the elastomer varies under different temperature conditions.

According to a second aspect of the present disclosure, there is provided a switching device, comprising: a stationary contact; a movable contact; an actuating assembly for driving the movable contact to move; and the limiting device according to the first aspect, wherein the movable part is the movable contact, or the movable part is a moving part of the actuating assembly in linkage with the movable contact.

In some embodiments, the limiting device is disposed adjacent to the stationary contact, the stationary contact comprises a first discharge hole in fluid communication with the hole, and an average inner diameter of the first discharge hole is smaller than that of the hole.

In some embodiments, the movable part comprises a second discharge hole in fluid communication with the hole, and an average inner diameter of the second discharge hole is smaller than that of the hole.

In some embodiments, the switching device is a circuit breaker, a disconnector, a load switch, or a contactor.

According to a third aspect of the present disclosure, there is provided an electrical equipment. The electrical equipment comprises: a movable part; and the limiting device according to the first aspect.

BRIEF DESCRIPTION OF THE DRAWINGS

The above and other objectives, features, and advantages of example embodiments of the present disclosure will become more apparent from the following detailed description with reference to the accompanying drawings. In the figures, several embodiments of the present disclosure are shown in an exemplary but unrestrictive manner.

In all figures, the same or corresponding reference numbers denote the same or corresponding parts.

DETAILED DESCRIPTION OF EMBODIMENTS

Figure 1:
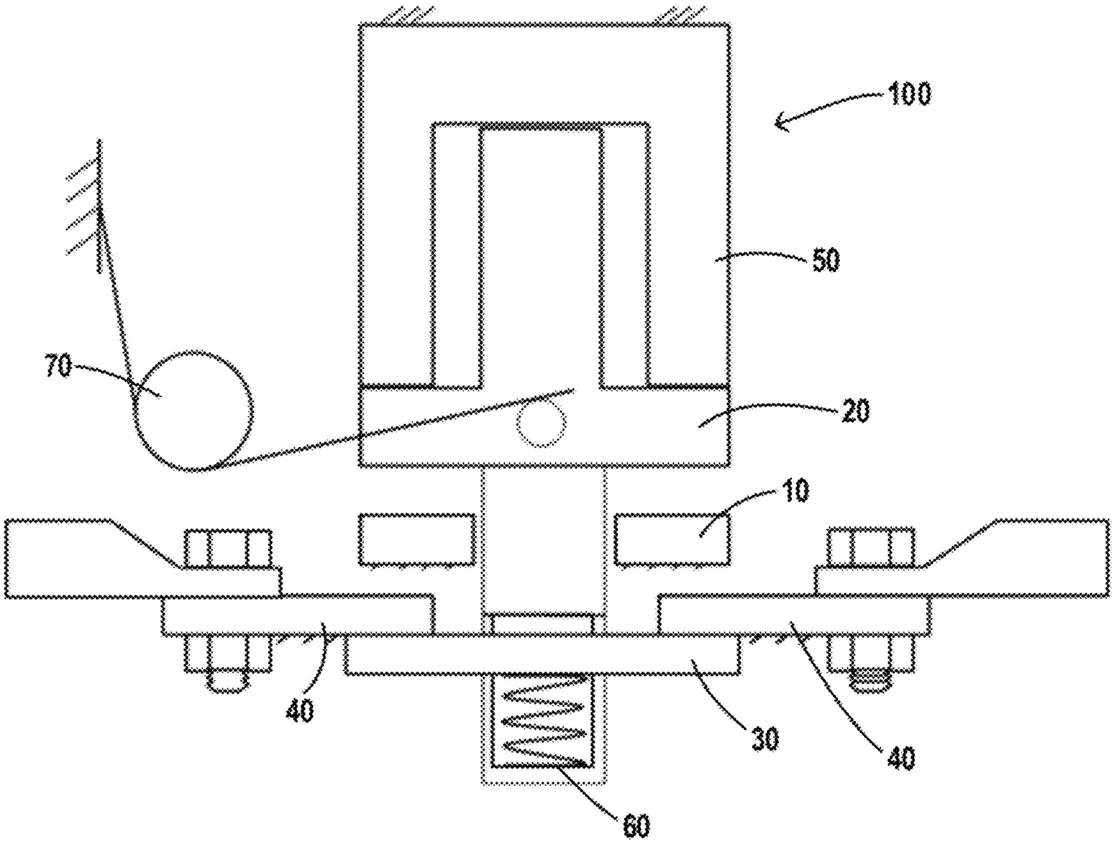
FIG. 1 shows a schematic view of a switching device according to an embodiment of the present disclosure, with the switching device in an open state.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms indicating placement or positional relationship such as "up", "down", "front" and "rear" are based on the orientation or positional relationship shown in the figures, and are only for the convenience in describing the principles of the present disclosure, rather than indicating or implying that the designated elements must have a particular orientation, be constructed or operated in a particular orientation, and thus should not be construed as limiting the present disclosure. The structural details and working principles of the limiting device (also referred to as a damper) according to embodiments of the present disclosure will be described in detail with reference to figures.

Figure 2:
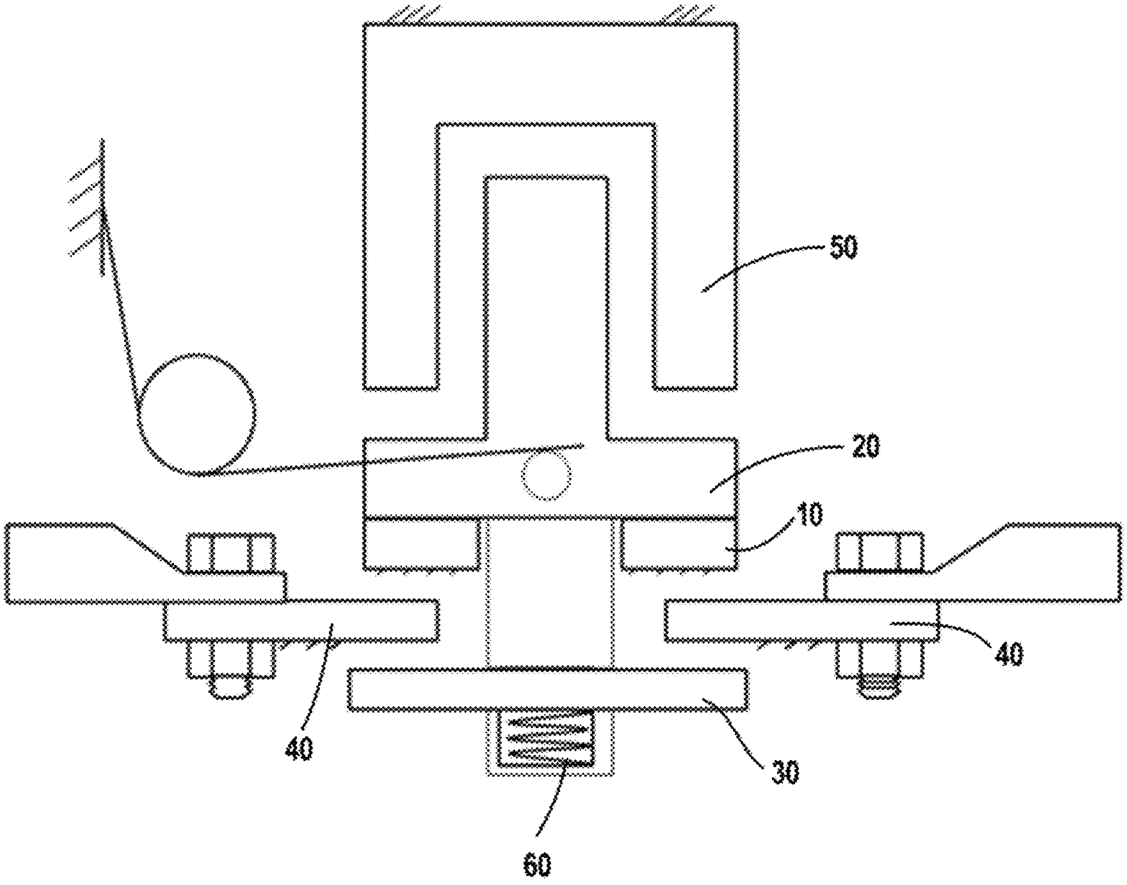
FIG. 2 shows a schematic view of a switching device according to an embodiment of the present disclosure, with the switching device in a closed state.

Switching devices such as circuit breakers are widely used in power systems. FIG. 1 and FIG. 2 respectively show schematic diagrams of main components of a switching device 100 according to an embodiment of the present disclosure. As shown in FIG. 1 and FIG. 2, the switching device 100 comprises a movable contact 30, a stationary contact 40, and an actuating assembly for driving the movable contact 30 toward or away from the stationary contact 40 (also referred to as a stationary part 40). In the illustrated embodiment, a pair of stationary contacts 40 are arranged spaced-apart from each other and may be disposed in an electrical circuit. The movable contact 30 may move in a predetermined direction (an up-down direction in the illustrated embodiment) to contact or separate from the stationary contacts 40.

When the switching device 100 is in a closed state, as shown in FIG. 1, the movable contact 30 is in contact with the stationary contacts 40, so that the electrical circuit is a closed circuit. When the switching device 100 is in an open state, as shown in FIG. 2, the movable contact 30 is separated from the stationary contacts 40 by a distance such that the electrical circuit is an open circuit. In the illustrated embodiment, the actuating assembly is shown as an electromagnetic actuator. As shown in FIG. 1 and FIG. 2, the actuating assembly comprises a stationary core 50 and a movable core 20 (also referred to as a movable part 20). The movable contact 30 may be fixedly provided on the movable core 20. Windings may be disposed around the stationary core 50. Movement of the movable core 20 may be controlled by energizing or de-energizing the windings. It should be appreciated that while in the illustrated embodiment the actuating assembly is shown as an electromagnetic actuator, this is merely exemplary and the actuating assembly may be any other suitable type of actuator. In the following description, the principle of the limiting device according to the embodiment of the present disclosure will be described with the electromagnetic actuator as an example.

When the switching device needs to be closed, the coil is energized and the movable core 20 is attracted to move upward. As shown in FIG. 1, the movable core 20 is at the uppermost position, and a return spring 60 stores energy during the upward movement of the movable core 20. As the movable core 20 moves, the movable contact 30 contacts the stationary contacts 40. The switching device 100 becomes the closed state. In some embodiments, as shown in FIG. 1, the switching device 100 may further comprise a closing maintaining means 70 configured to apply a force to the movable contact 30 to reliably maintain the movable contact 30 in the closed state. In the illustrated embodiment, the closing maintaining means 70 is shown as a torsion spring. It should be appreciated that the torsion spring is merely exemplary and that the closing maintaining means 70 may be implemented as any other suitable maintaining means.

When the switching device needs to be opened, the coil is de-energized and the magnetic force for attracting the movable core 20 is reduced or eliminated. The return spring 60 releases its stored energy, and the movable core 20 moves downward by a restoring force of the return spring 60 to separate the movable contact 30 from the stationary contacts 40. In order to prevent the movable contact 30 from coming into contact with the stationary contacts 40, a stopper 10 may be provided on a moving path of the movable contact 30 or the movable core 20 of the actuating assembly, to limit a lower limit of the position of the movable core 20 of the actuating assembly. The inadvertent contact between the movable contact 30 and the stationary contacts 40 upon opening of the switching device may be prevented by using the stopper 10 as the limiting device or as a part of the limiting device.

The stopper 10 comprises a stop surface 11. As shown in FIG. 2, the movable contact 30 moves away from the stationary contacts 40 by the restoring force 60. In this process, the movable core 20 contacts the stop surface 11 of the stopper 10, thereby restricting the movable core 20 from further moving. It will be appreciated that in the illustrated embodiment, the stopper 10 is provided in the moving path of the movable core 20, which is merely exemplary, and that the stopper 10 may be provided in any other suitable position as long as it can make contact with the movable part of the switching device to prevent movement of the movable part.

Taking a circuit breaker as an example, the movable contact of the circuit breaker is designed to be used to contact the stationary contacts for millions of times. In other words, even after the movable part 20 collides with the stopper 10 many times, the stopper 10 should not be damaged and reliably performs its stopping function. In order to ensure the durability of the stopper 10, the stopper 10 is mainly formed of an elastomer. After the stopper 10 collides with the movable part 20, the movable part 20 is rebounded by a reaction force of the stopper. The stopper 10 may absorb energy through elastic deformation of the elastomer to attenuate the kinetic energy of the movable part 20, thereby reducing or decreasing the rebound between the movable core 20 and the stop surface 11 of the stopper 10 while ensuring durability. The elastomer is configured to deform to absorb energy from the movable part 20 when the movable part 20 collides with the stop surface 11 in a first direction. Specifically, the elastomer may convert the kinetic energy of the movable core 20 into an elastic potential energy of the elastomer, thereby attenuating the kinetic energy of the movable core 20.

Figure 3:
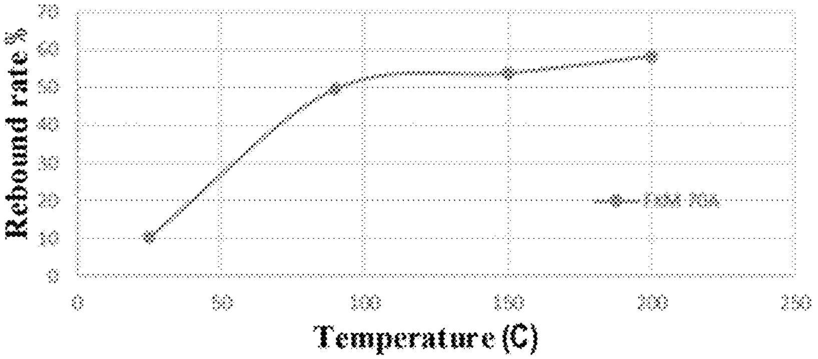
FIG. 3 shows a schematic diagram of a curve illustrating changes of a rebound rate of an elastomer versus temperature according to an embodiment of the present disclosure.
Figure 4:
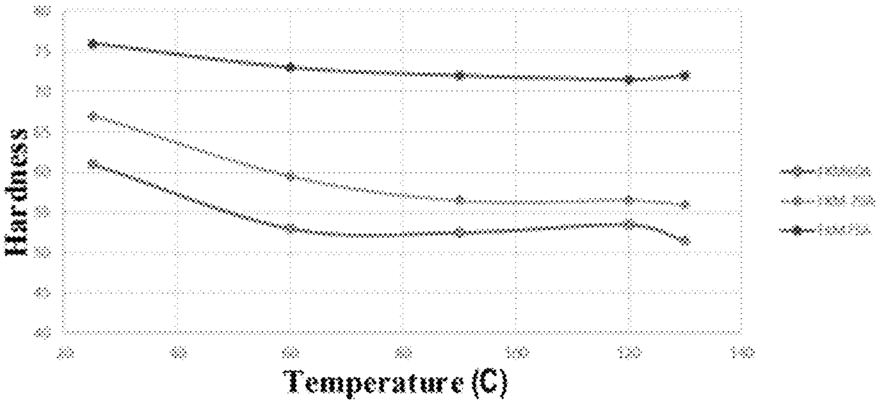
FIG. 4 shows a schematic diagram of a curve illustrating changes of hardness of an elastomer versus temperature according to an embodiment of the present disclosure.

Inside the electrical equipment, a heat generating member, such as an electrical conductor, is typically arranged. When the temperature in the electrical equipment is high, the performance of the elastomer will be affected. FIG. 3 and FIG. 4 show a schematic diagram of a curve illustrating changes of a rebound rate of an elastomer versus temperature according to an embodiment of the present disclosure, and a schematic diagram of a curve illustrating changes of hardness of an elastomer versus temperature according to an embodiment of the present disclosure. FIG. 3 shows a curve illustrating changes of a rebound rate of an elastomer versus temperature by taking an elastomeric material FKM 70A having a Shore hardness of 70A as an example. When the temperature is 25° C., the rebound rate is 10%. As the temperature rises, the rebound rate will be as high as 50% when the temperature is 90-100° C. The rebound rate increases. This means that when the elastomer is in contact with the movable core 20, the movable core 20 is more capable of compressing the deformation of the elastomer in a case where the movable core 20 has the same travel distance. The position-limiting ability of the elastomer sharply decreases, thereby increasing the risk of the inadvertent contact between the movable contact 30 and the stationary contacts 40.

Similarly, FIG. 4 shows curves illustrating changes of hardness of the elastomer versus temperature by taking three elastomeric materials FKM 60A, FKM 70A, FKM 75A having Shore hardnesses of 60A, 70A, 75A, respectively as an example. When the temperature is 25° C., the hardness of the elastomer materials FKM 60A, FKM 70A and FKM 75A may reach about 62, 67 and 77 respectively; as the temperature rises, the hardness of the elastomer materials FKM 60A, FKM 70A and FKM 75A decreases linearly. When the temperature is 90° C., the hardness of the elastomer materials FKM 60A, FKM 70A and FKM 75A may be up to about 53, 56 and 71, respectively. This means that when the elastomer is in contact with the movable core 20, the elastomer deforms to a greater extent in a case where the movable core 20 has the same travel distance, and the position-limiting ability of the elastomer sharply decreases, thereby increasing the risk of the inadvertent contact between the movable contact 30 and the stationary contacts 40.

Figure 5:
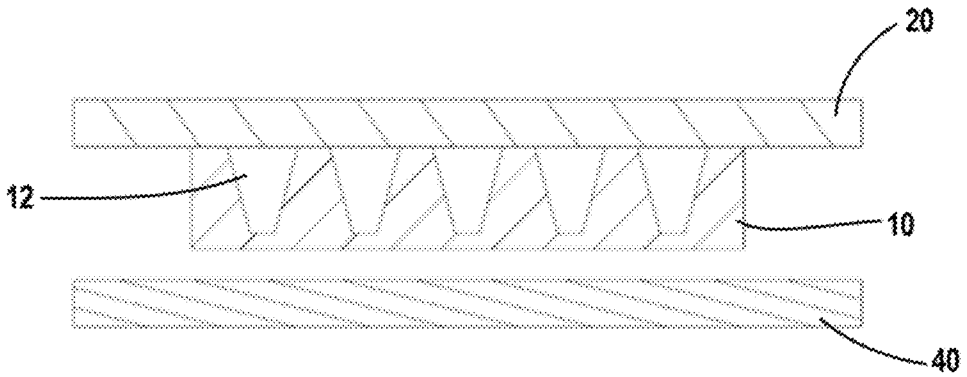
FIG. 5 shows a cross-sectional view illustrating a working principle of a limiting device according to one embodiment of the present disclosure.

FIG. 5 shows a cross-sectional view illustrating a working principle of a limiting device according to one embodiment of the present disclosure. The stopper may be implemented in the shape of an elastomeric block, such as a square block, a conical block, etc. The stopper 10 may comprise one or more holes 12 distributed along the stop surface. In the illustrated embodiment, merely a state in which the stopper 10 is in contact with the movable part 20 is shown. In the illustrated embodiment, the holes 12 are shown in the shape of a conical hole. It should be appreciated that this is merely exemplary and that the holes 12 may be implemented in a variety of forms.

In the embodiment shown in FIG. 5, the holes 12 are shown in a shape with an opening on the side of the stop surface and a closed shape on a side opposite the stop surface. In this case, when the movable part 20 collides with the stop surface 11 in the first direction, deformation of the elastomer may be improved through the holes 12 to absorb energy from the movable part 20. In other embodiments, the holes 2 may also be implemented in a form of through holes. In a case where the holes are implemented as through holes, the holes have an additional advantage compared to the closed shape of the holes, which will be described in detail later.

Initially, the stopper 10 is disposed away from the movable part 20 in the moving path of the movable part 20. When the movable part 20 moves along a predetermined movement path to collide with the stopper 10, the elastomer of the stopper 10 deforms to absorb the kinetic energy of the movable part 20. On the other hand, the elastomer of the stopper 10 is provided with the holes 12, and the holes 12 may further improve the deformation of the elastomer to further absorb the energy from the movable part 20. By providing the holes 12 in the stopper 10, the shock-absorbing capability of the elastomer may be enhanced, thereby reducing the influence on the performance of the elastomer due to the changes of the temperature in the interior of the electrical equipment.

Figure 6:
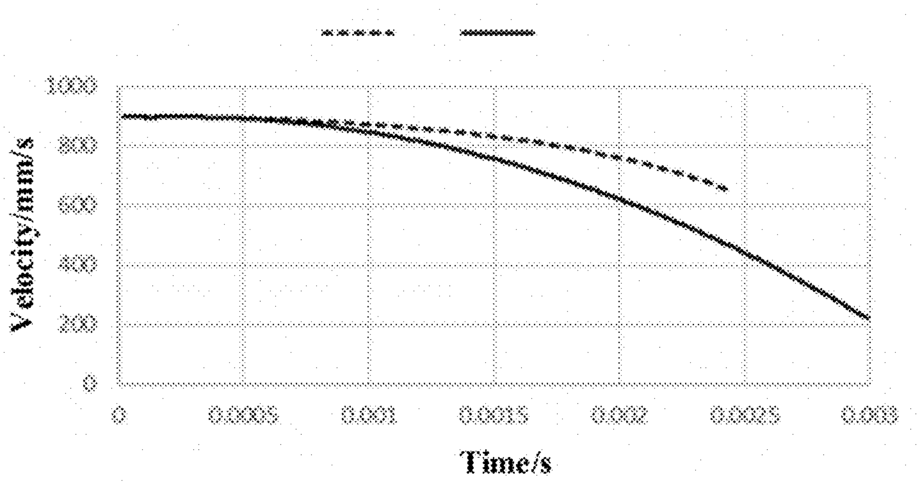
FIG. 6 shows a schematic diagram of a curve illustrating changes of velocity of a movable part versus temperature according to an embodiment of the present disclosure.

FIG. 6 shows a schematic diagram of a curve illustrating changes of velocity of a movable part versus temperature according to an embodiment of the present disclosure. In the curve shown in FIG. 6, the dashed line shows a simulation diagram of the changes of the velocity in a case where the elastomer is not provided with the holes 12, and the solid line shows a simulation diagram of changes of the velocity in a case where the elastomer is provided with the holes 12. As shown in FIG. 6, when the movable part 20 is brought into contact with the stop surface 11 of the stopper 10, in the case where the elastomer is provided with the holes 12, the change rate of the velocity of the movable part 20 is larger and a contact time of the movable part with the elastomer is longer. This means that the elastomer has a better shock-absorbing effect on the movable part. In a case where the elastomer has the same temperature change effect, the shock-absorbing effect of the elastomer on the movable part is increased, and the influence caused by the elastomer due to changes of the temperature may be reduced.

In the illustrated embodiment, when the elastomer is not provided with the holes 12, the contact time between the movable part and the elastomer is approximately 0.0024 seconds; when the elastomer is provided with the holes 12, the contact time between the movable part and the elastomer increases to more than 0.003 seconds. A longer contact time between the movable part and the elastomer means that the elastomer has a better shock-absorbing effect on the movable part. It can also be seen from the rate change that in the case where the elastomer is provided with the holes, the decelerating effect of the elastomer is significant. In the case where the elastomer is not provided with the holes 12, the speed at which the movable part is separated from the elastomer is up to 600 mm/s; in the case where the elastomer is provided with the holes 12, the speed at which the movable part is separated from the elastomer reduces to 200 mm/s.

In some embodiments, the holes are implemented in the form of through holes through the thickness direction of the elastomer. The through holes are configured such that a fluid in the through holes at least partially flows out of the through holes when the movable part 20 collides with the stop surface 11 of the stopper 10 in the first direction. In this case, when the movable part 20 collides with the stop surface 11 of the stopper 10 in the first direction, a part of the impact kinetic energy of the movable part 20 may be converted into the kinetic energy of the fluid, whereby the shock-absorbing effect of the elastomer on the movable part may be further enhanced.

A principle of how the stopper with through holes provides a shock absorption according to the present disclosure is as follows. The kinetic energy of the fluid is mainly composed of a viscous item and an inertial item. The Inventors have found from tests that at a high temperature, the viscous item of the kinetic energy of the fluid dominates the kinetic energy of the fluid. The inertial item of the kinetic energy of the fluid is influenced by the shape of the holes. As the internal temperature of the electrical equipment increases, the viscosity item of the fluid gradually increases and the shock absorbing effect of the elastomer on the movable part at the high temperature becomes more significant. Thus, it is possible to compensate for the performance deterioration due to the temperature change by converting a part of the impact kinetic energy of the movable part 20 into the kinetic energy of the fluid.

In some embodiments, the through hole forms a cavity having a predetermined volume. The shape of the cavity is configured to: when the movable part 20 collides with the stop surface 11 of the stopper 10 in the first direction, an overpressure condition which exceeds the ambient pressure occurs in the cavity. Thus, the shock-absorbing effect of the stopper 10 may be increased. When the movable part 20 rebounds away from the stop surface 11 of the stopper 10 in a second direction opposite to the first direction under the reaction force of the elastomer, an under-pressure condition below the ambient pressure occurs in the cavity. Thus, the reaction force of the stopper 10 against the movable part 20 may be reduced. When the temperature rises, the viscous item of the kinetic energy of the fluid increases, and the shock-absorbing effect is more significant.

In some embodiments, the through hole has a shape that tapers stepwise or linearly along the first direction. By way of example, the hole shape may be one of a cone, a pyramid, a truncated cone, or a stepped hole, or their combination. It should be understood that this is merely exemplary and that the through hole may also be formed in any other similar shape as long as the inertial item of the kinetic energy of the fluid can be increased.

FIG. 7-FIG. 11 show cross-sectional views of the working principles of limiting devices according to various embodiments of the present disclosure. In these figures, they show a state when the movable part 20 collides with the stop surface 11 of the stopper 10 in the first direction.

Figure 7:
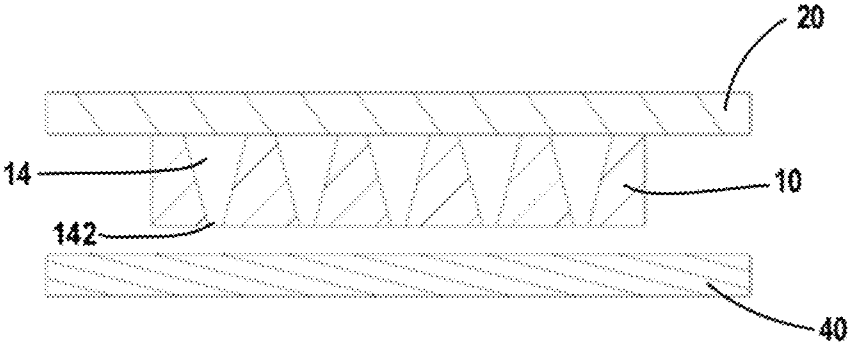
FIG. 7 shows a cross-sectional view illustrating a working principle of a limiting device according to another embodiment of the present disclosure.

In the embodiment shown in FIG. 7, the hole of the stopper 10 is implemented in a form of a through hole 14. The through hole 14 comprises an opening having a larger aperture at the side of the stop surface. The through hole 14 may include an opening 142 having a smaller aperture on a side opposite the stop surface. With such an arrangement, the above-mentioned desired over-pressure condition and under-pressure condition may be conveniently formed. In the illustrated embodiment, the through hole 14 is shown in the shape of a tapered hole. It should be appreciated that that this is merely exemplary and that the through hole 14 may be implemented in various shapes such as a conical, pyramidal, frusto-conical, or stepped hole shape.

In the embodiment shown in FIG. 7, the stopper 10 is arranged at a distance from the stationary part 40. The overpressure condition and under-pressure condition within the cavity of the through hole are achieved by the shape of the through hole 14 itself. The through hole 14 comprises a first hole and a second hole 142 communicated with the first hole. An average hole size of the second hole 142 is smaller than that of the first hole. When the movable part 20 collides with the stopper 10, air in the through hole 14 is rapidly compressed and the pressure increases (e.g., increases to the overpressure condition), thereby converting the kinetic energy of the movable part 20 into potential energy of the fluid. During this process, the overpressure fluid gradually releases the air pressure through the second hole 142. As the movable part 20 continues to compress the elastomer, the air within the elastomer is gradually evacuated. Due to the small diameter of the second hole 142, the under-pressure condition is formed in the through hole 14. As the reaction force of the stopper 10 causes the movable part 20 to rebound in the opposite direction (i.e., the movable part 20 will move away from the elastomer), whereupon because the stopper 10 is still in the compressed state, the under-pressure environment is formed within the through hole 14 and the pressure in the through hole 14 cannot immediately increase to the atmospheric pressure, thereby reducing the energy potentially applied to the movable part 20 by absorbing a portion of the energy by the fluid in the through hole 14. Thus, the fluid dynamic effect of the through holes 14 may be utilized to enhance the shock-absorbing effect to compensate for the performance deterioration of the elastomer due to the temperature rise.

Figure 8:
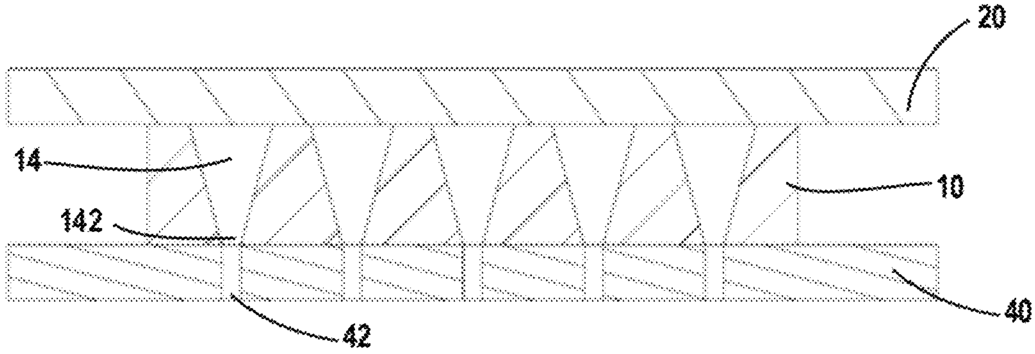
FIG. 8 shows a cross-sectional view illustrating a working principle of a limiting device according to a further embodiment of the present disclosure.

The embodiment shown in FIG. 8 is similar to that shown in FIG. 7. The difference lies in that in the embodiment shown in FIG. 8, the stopper 10 is arranged adjacent to the stationary part 40, in particular in surface contact with the stationary part 40. In this case, the stationary part 40 may be used as a part of the limiting device. As shown in FIG. 8, the stationary part 40 may comprise a first discharge hole 42 in fluid communication with the through hole 14. The first discharge hole 42 has a small inner diameter and serves as a fluid discharge hole. When the movable part 20 collides with the stopper 10, air in the through hole 14 is rapidly compressed and the pressure increases (e.g., increases to the overpressure condition), thereby converting the kinetic energy of the movable part 20 into potential energy of the fluid. During this process, the overpressure fluid gradually releases the air pressure through the first discharge hole 42. As the movable part 20 continues to compress the elastomer, the air within the elastomer is gradually evacuated. Due to the small diameter of the first discharge hole 42, the under-pressure condition is formed in the through hole 14. As the reaction force of the stopper 10 causes the movable part 20 to rebound in the opposite direction (i.e., the movable part 20 will move away from the elastomer), whereupon because the stopper 10 is still in the compressed state, the under-pressure environment is formed within the through hole 14 and the pressure in the through hole 14 cannot immediately increase to the atmospheric pressure, thereby reducing the energy potentially applied to the movable part 20 by absorbing a portion of the energy by the fluid in the through hole 14. Thus, the cooperative hydrodynamic effect of the through hole 14 and the first discharge hole 42 may be utilized to enhance the shock-absorbing effect to compensate for the performance deterioration of the elastomer due to the temperature rise.

Figure 9:
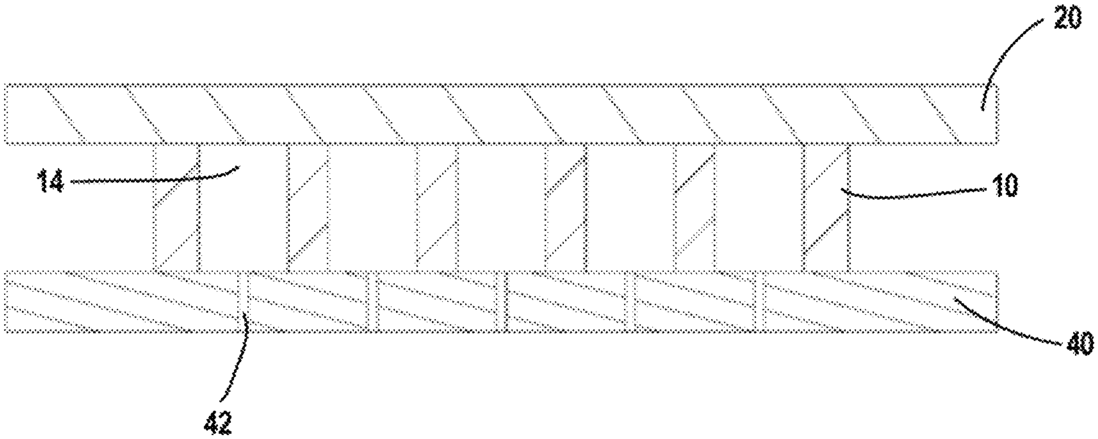
FIG. 9 shows a cross-sectional view illustrating a working principle of a limiting device according to a further embodiment of the present disclosure.
Figure 10:
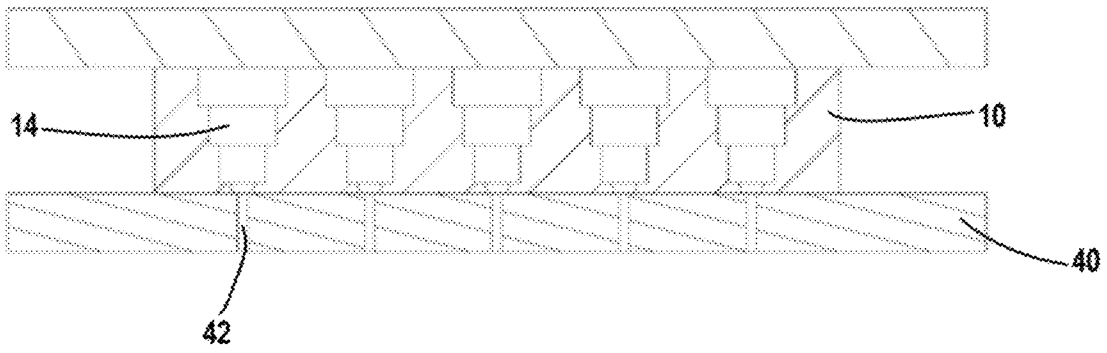
FIG. 10 shows a cross-sectional view illustrating a working principle of a limiting device according to a further embodiment of the present disclosure.

The embodiment shown in FIG. 9 is similar to that shown in FIG. 8, except that the shape of the through hole 14 differs from that shown in FIG. 8. As shown in FIG. 9, the through hole 14 is formed in the shape of a cylinder. The operation process of the through hole 14 is similar to that of FIG. 8, and a detailed description thereof will be omitted. The embodiment shown in FIG. 10 is similar to that shown in FIG. 8, except that the shape of the through hole 14 differs from that shown in FIG. 8. As shown in FIG. 10, the through hole 14 is formed in the shape of a stepped hole. The operation process of the through hole 14 is similar to that of FIG. 8, and a detailed description thereof will be omitted. It should be appreciated that the illustrated shapes of the holes are merely exemplary and that the holes may be formed in any other suitable shapes.

Figure 11:
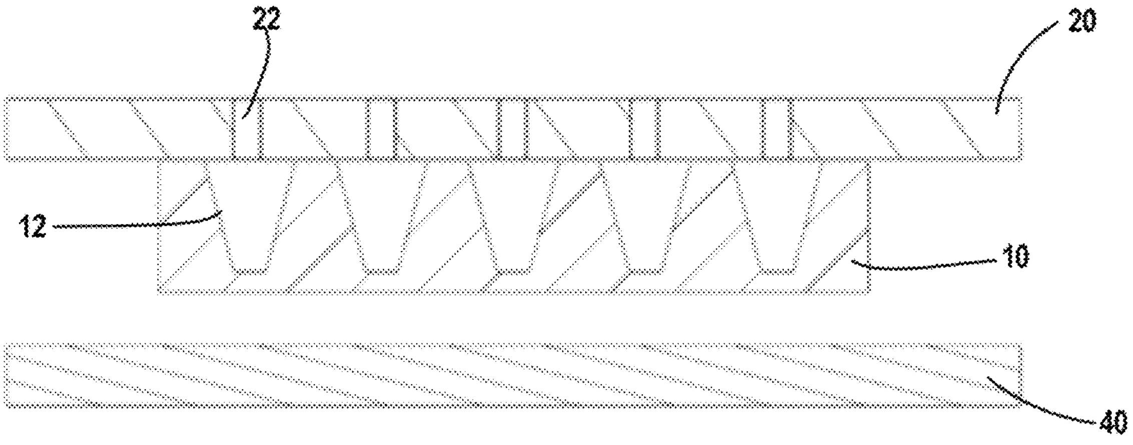
FIG. 11 shows a cross-sectional view illustrating a working principle of a limiting device according to a further embodiment of the present disclosure.

FIG. 11 shows a cross-sectional view illustrating a working principle of a limiting device according to a further embodiment of the present disclosure. The embodiment shown in FIG. 11 is similar to that shown in FIG. 8 to FIG. 10, except that instead of providing the discharge holes on the stationary part 40, second discharge holes 22 may be provided on the movable part 20, and the second discharge holes 22 achieve the hydrodynamic effect in cooperation with the holes 12 to enhance the shock-absorbing effect and compensate for the performance deterioration of the elastomer due to the rise of the temperature. In the embodiment shown in FIG. 11, the stopper 10 is provided with openings only on the side of the stop surface and is closed on the side opposite the stop surface, which is merely exemplary. In other embodiments not shown, the stopper 10 may also be open on the side opposite the stop surface, as long as the average inner diameter of the openings is smaller than that of the holes 12. In both cases, it is possible to achieve a hydrodynamic effect and compensate for the deterioration of the performance of the elastomer due to the temperature rise.

According to the embodiments of the present disclosure, with the holes being provided in the elastomer, the impact-resistant performance of the elastomer is significantly improved, the performance deterioration of the elastomer due to the temperature rise is compensated, and the stopping performance of the elastomer is significantly improved.

Application scenarios of the stopping device according to embodiments of the present disclosure have been described above with a circuit breaker as an example of the switching device. It should be appreciated that that this is only exemplary and that the switching device may also be a switch such as a disconnector, a load switch, a contactor, etc. Furthermore, although the operating principle of the stopping device according to the embodiment of the present disclosure has been described with the movable core of the switching device for driving the movable contact as an example according to the embodiment of the present disclosure, it should be appreciated that this is only exemplary and that the movable part of the embodiment of the present disclosure may be any other movable part within the electrical equipment.

In addition, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A switching device for limiting movement of a movable part in an electrical equipment, comprising:
- a stationary contact;
- a movable contact;
- an actuating assembly for driving the movable contact to move, the actuating assembly comprising a movable part; and
- a stopper provided in a moving path of the movable part and configured to contact the movable part at a predetermined position to prevent the movable part from moving; and
- wherein the stopper is mainly formed of an elastomer and comprises a stop surface, the elastomer being configured to be deformed when the movable part collides with the stop surface in a first direction; and
- wherein the elastomer further comprises a hole, wherein the hole comprises a through hole running through the elastomer in a thickness direction, and the through hole is configured to allow a fluid in the through hole to flow at least partially out of the through hole when the movable part collides with the stop surface in the first direction.

2. The limiting switching device according to claim 1, wherein the through hole comprises a cavity having a volume and a shape of the cavity is configured in such a way that an overpressure condition exceeding an ambient pressure occurs within the cavity when the movable part collides with the stop surface in the first direction, and an underpressure condition below the ambient pressure occurs in the cavity when the movable part rebounds away from the stop surface in a second direction opposite to the first direction under a reaction force of the elastomer.

3. The limiting switching device according to claim 1, wherein the through hole has a hole shape that tapers stepwise or linearly in the first direction.

4. The limiting switching device according to claim 3, wherein the hole shape comprises one of a cone, a pyramid, a truncated cone, or a stepped hole.

5. The limiting switching device according to claim 1, wherein the through hole comprises a first hole and a second hole in communication with the first hole, the first hole and the second hole is arranged in the first direction, and an average inner diameter of the second hole is smaller than that of the first hole.

6. The limiting switching device according to claim 1, further comprising a stationary part and the elastomer is in surface contact with the stationary part or disposed at a distance from the stationary part.

7. The limiting switching device according to claim 6, wherein the elastomer is in surface contact with the stationary part and the stationary part comprises a first discharge hole in fluid communication with the hole.

8. The limiting switching device according to claim 7, wherein an average inner diameter of the first discharge hole is smaller than that of the hole.

9. The limiting switching device according to claim 1, wherein the movable part comprises a second discharge hole in fluid communication with the hole at a surface opposite the stop surface.

10. The limiting switching device according to claim 9, wherein an average inner diameter of the second discharge hole is smaller than that of the hole.

11. The limiting switching device according to claim 1, wherein the electrical equipment switching device has different operating temperatures, and a rebound resilience and/or hardness of the elastomer varies under different temperature conditions.

12. The switching device according to claim 1, further comprising a limiting device, wherein the limiting device is disposed adjacent to the stationary contact, the stationary contact comprises a first discharge hole in fluid communication with the hole and an average inner diameter of the first discharge hole is smaller than that of the hole.

13. The switching device according to claim 1, wherein the movable part comprises a second discharge hole in fluid communication with the hole and an average inner diameter of the second discharge hole is smaller than that of the hole.

14. The switching device according to claim 1, wherein the switching device is a circuit breaker, a disconnector, a load switch, or a contactor.

15. An electrical equipment, comprising:
- a stationary contact;
- a movable contact;
- an actuating assembly for driving the movable contact to move, the actuating assembly comprising a movable part; and
- a limiting device according to claim 1 comprising:
- a stopper provided in a moving path of the movable part and configured to contact the movable part at a predetermined position to prevent the movable part from moving; and
- wherein the stopper is mainly formed of an elastomer and comprises a stop surface, the elastomer being configured to be deformed when the movable part collides with the stop surface in a first direction; and
- wherein the elastomer further comprises a hole, wherein the hole comprises a through hole running through the elastomer in a thickness direction, and the through hole is configured to allow a fluid in the through hole to flow at least partially out of the through hole when the movable part collides with the stop surface in the first direction.

16. The electrical equipment of claim 15, further comprising:
- a stationary core; and
- a movable core coupled to the stationary core, the movable core comprising the movable part.

17. The electrical equipment of claim 16, further comprising a return spring coupled to the movable core.

18. A circuit breaker, comprising:
- a stationary contact;
- a movable contact;
- an actuating assembly comprising a stationary core and a movable part coupled to the stationary core, wherein the actuating assembly is configured to drive the movable contact toward or away from the stationary contact; and a limiting device comprising:

a stopper provided in a moving path of the movable part and configured to contact the movable part at a predetermined position to prevent the movable part from moving; and wherein the stopper is mainly formed of an elastomer and comprises a stop surface, the elastomer being configured to be deformed when the movable part collides with the stop surface in a first direction; and wherein the elastomer further comprises a hole, wherein the hole comprises a through hole running through the elastomer in a thickness direction, and the through hole is configured to allow a fluid in the through hole to flow at least partially out of the through hole when the movable part collides with the stop surface in the first direction.

19. The circuit breaker of claim 18, further comprising a return spring coupled to the movable part.

20. The circuit breaker of claim 18, wherein the through hole comprises a cavity having a volume and a shape of the cavity is configured in such a way that an overpressure condition exceeding an ambient pressure occurs within the cavity when the movable part collides with the stop surface in the first direction, and an under-pressure condition below the ambient pressure occurs in the cavity when the movable part rebounds away from the stop surface in a second direction opposite to the first direction under a reaction force of the elastomer.

* * * * *